United States Patent [19]

Jamison

[11] 3,725,461
[45] Apr. 3, 1973

[54] TEREPHTHALIC BASED UNSATURATED POLYESTERS

[75] Inventor: Saunders E. Jamison, Summit, N.J.

[73] Assignee: Celanese Corporation, New York, N.Y.

[22] Filed: Apr. 13, 1970

[21] Appl. No.: 32,497

[52] U.S. Cl. ........................260/475 P, 260/861
[51] Int. Cl. ................................C07c 69/82
[58] Field of Search ..........................260/475 P

[56] References Cited

UNITED STATES PATENTS

| | | | |
|---|---|---|---|
| 3,322,817 | 5/1967 | Goldberg et al. | 260/475 P |
| 3,360,545 | 12/1967 | Wygant | 260/485 G |
| 2,607,798 | 8/1952 | Weesner | 260/475 |
| 2,075,107 | 3/1937 | Frazier | 260/475 |

Primary Examiner—Henry R. Jiles
Assistant Examiner—E. Jane Skelly
Attorney—Thomas J. Morgan, Marvin Turken and Charles E. Miller

[57] ABSTRACT

A process is disclosed for the preparation of terephthalate based unsaturated polyesters by first reacting a mono unsaturated dicarboxylic acid anhydride having from 4–10 carbon atoms with a terephthalic acid glycol ester having the general formula:

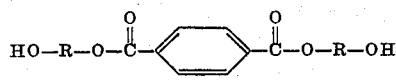

wherein R is $C_2$ to $C_6$ alkylene to form a glycol ester-mono unsaturated acid adduct and then reacting this adduct with an oxide having the general formula:

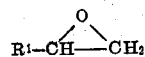

wherein $R^1$ is H or an organic radical having from one to eight carbon atoms. The resulting polyester is useful in preparing protective coatings and plastics when blended with an ethylenically unsaturated monomer and an addition polymerization initiator system.

1 Claim, No Drawings

TEREPHTHALIC BASED UNSATURATED POLYESTERS

BACKGROUND OF INVENTION

The field of art to which this invention pertains is unsaturated polyester, particularly terephthalic acid-based unsaturated polyesters.

Thermosetting unsaturated polyester resins are well known in the art. Typically, they are based upon the reaction of a polyol and a polybasic ethylenically unsaturated polyacid. Due to the tendency of terephthalic acid and its alkyl esters to sublime when heated, attempts to incorporate terephthalate moities into unsaturated polyester resins have been unsuccessful.

SUMMARY OF INVENTION

Surprisingly, it has now been found that, unlike alkyl esters, bis(alkylene glycol) esters of terephthalic acid do not sublime when attempts are made to incorporate them into unsaturated polyester formulations. According to the process of this invention, a mono-unsaturated dicarboxylic acid anhydride is reacted with a terephthalic acid glycol ester having the general formula:

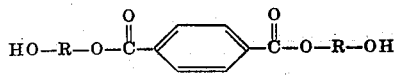

wherein R is $C_2$ to $C_6$ alkylene, to form a glycol ester mono-unsaturated acid adduct. The adduct is then further reacted with an oxide having the general formula:

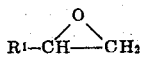

wherein $R^1$ is H or an organic radical having from one to eight carbon atoms.

The resulting unsaturated polyester is then blended with an ethylenically unsaturated monomer and a polymerization initiator system and used in any of the usual unsaturated polyester applications including the formation of protective coatings and molded plastics.

DESCRIPTION OF INVENTION

The terephthalic acid glycol ester useful in this invention has the general formula:

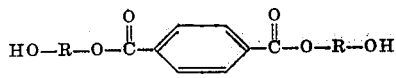

wherein R is a $C_2$ to $C_6$ alkylene containing only carbon and hydrogen. Thus the ethyl, propyl, butyl, pentyl, or hexyl glycol esters of terephthalic acid can be used. Formation of the $C_2$ to $C_6$ alkylene glycol esters can be carried out by any of several well-known methods. Included is the reaction of an alkylene oxide such as ethylene or propylene oxide with terephthalic acid. Likewise, free terephthalic acid can be esterified with the desired glycol or a dialkyl terephthalate can be transesterified with the desired glycol.

Reacted with each mol of the terephthalic acid glycol ester is about 2 mols of a mono-unsaturated dicarboxylic acid anhydride having from four to about 10 carbon atoms per molecule and containing no other hydroxyl or acid reactive groups. Examples of this acid include maleic anhydride and citraconic anhydride. [The compound resulting from the reaction of the terephthalic acid glycol ester and the mono unsaturated acid anhydride is hereinafter referred to as a glycol ester-mono unsaturated acid aduct.] This reaction is carried out at about 75°C to 150°C preferably about 85°C to 125°C.

The oxides useful in preparing the unsaturated polyester of this invention can be either alkylene oxides or they can be mono glycidyl ethers. Examples of the alkylene oxides include, ethylene oxide, propylene oxide, butylene oxide, styrene oxide, and the like. The mono glycidyl ethers include butyl glycidyl ether, pentyl glycidyl ether, isopropyl glycidyl ether, phenyl glycidyl ether and the like. Preferred among the above oxides are those having the general formula

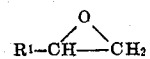

wherein $R'$ is H or an organic radical having from one to eight carbon atoms. [It is understood that in the above formula $R^1$ can include an ether group.] Most preferred among the oxides are ethylene oxide and propylene oxide.

The oxide is reacted with the above glycol ester-mono unsaturated acid adduct in amount equal to about 1 mol of oxide for each mol of reacted unsaturated acid anhydride to form the unsaturated polyester resins of this invention. Thus in the preferred reaction about 1 mol of the terephthalic acid glycol ester is reacted with about 2 mols of the mono unsaturated acid anhydride and the resulting product is then reacted with about 2 mols of oxide. This reaction should be carried out below the boiling point of the particular oxide that is used. In instances where a catalyst such as a tertiary amine, quaternary amine salt, thiol, mercaptan or disulfide is used temperatures in the range of about 25°C to 100°C can be used depending, of course, on the oxide boiling point. In instances where no catalyst is used temperatures as high as 75°C to 150°C may be required.

Blended with the terephthalic based unsaturated polyester is a mono ethylenically unsaturated monomer which is polymerizable with the previously described mono unsaturated acid anhydride. The monomer may be any one or more of a wide variety, such as vinylidene chloride and the vinyl esters of fatty acids having from one to 18 carbon atoms, including vinyl acetate, vinyl propionate, vinyl butyrate, vinyl laurate, vinyl oleate, and vinyl stearate. Esters of acrylic acid or of methacrylic acid with alcohols having from one to 18 carbon atoms may likewise be employed. Examples include methyl acrylate or methacrylate, ethyl acrylate or methacrylate, propyl acrylate or methacrylate, isopropyl acrylate or methacrylate, the various butyl acrylates or methacrylates, cyclohexyl acrylate or methacrylate, 2-ethylhexyl acrylate or methacrylate, benzyl acrylate or methacrylate, phenyl acrylate or methacrylate, n-hexyl, n-octyl, t-octyl, dodecyl, hexadecyl, or octadecyl acrylates or methacrylates. Acrylonitrile, methacrylonitrile, acrylamide, methacrylamide, styrene, α-methyl styrene, vinyl toluenes, acrylic acid, acrylic acid anhydride, methacrylic acid, methacrylic anhydride, fumaric acid, crotonic acid, allyl acetate, glycidyl methacrylate, t-butylaminoethyl methacrylate, hydroxyalkyl acrylates or methacrylates such as β-hydroxyethyl methacrylate, β-hydroxypropyl methacrylate, β-hydroxyethyl vinyl ether, β-hydroxyethyl vinyl sulfide, N-vinyl-2-pyrrolidone, N,N-dimethylaminoethyl methacrylate, etc.

The unsaturated polyester can be reduced to about 80 to about 30 weight percent solids in the ethylenically unsaturated monomer, preferably about 50 to about 70 percent solids.

In order to cure the above blends a catalyst or initiator system should be incorporated therein using compositions and amounts well known in the art. Generally about 0.1 to 25 percent [preferably about 0.25 to 7.5 weight percent], based on the total weight of the unsaturated polyester and the ethylenically unsaturated monomer, of a free radical polymerization initiator system is incorporated into these blends. The first portion of this system is an organic addition polymerization initiator or catalyst. Examples include organic peroxides and other free radical sources such as benzoyl peroxide, peracetic acid, methyl ethyl ketone peroxide, cyclohexane peroxide, cyclohexyl hydroperoxide, cumene hydroperoxide, tertiary butyl perbenzoate, tertiary butyl peroctoate, dicumyl peroxide, azobisisobutyronitrile, ditertiary butyl peroxide, and so on. Also added as the other portion of this system is an activator for the above initiator. These activators are of two main types — tertiary amine and dryer type — and may be added either alone or together. Included among the tertiary amines are N,N diethyl aniline, N,N dimethyl aniline, triethyl amine, etc. Among the dryer types are included cobalt naphthenate, cobalt ethyl hexoate and other well known driers commonly used to aid the air drying of alkyd resins. Finally, miscellaneous activators including the mercaptans such as lauryl mercaptan, benzoin and biacetyl can also be used.

Solutions prepared in the above manner have a wide variety of uses in either their pigmented or unpigmented forms They can be used as corrosion resistant reinforced plastics, in molded boat hulls, and the like. Likewise they can be used as protective coatings.

In the following examples parts and percentages unless otherwise stated are by weight.

EXAMPLE I

An unsaturated polyester having the formula:

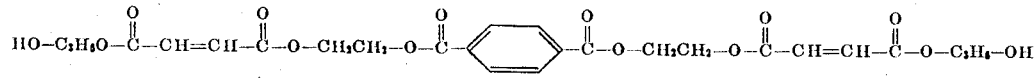

was prepared by reacting 1 mol of bis(2-hydroxyethyl)terephthalate (BHET) with 2 mols of maleic anhydride and then further reacting the resuling product with 2 mols of propylene oxide. The BHET was prepared by condensing at 160°C in a sealed vessel ethylene oxide and terephthalic acid in the presence of triethylamine in a mixture of about 20 percent ethyl benzene and 80 percent xylene; extracting the thus formed diester with water and recrystallizing from a water mixture. Maleic anhydride was added to the BHET and the two materials were reacted at 110°C to 115°C for about 30 minutes. Propylene oxide was added to the light straw-colored syrup thus obtained and coreaction was carried out at 30°C producing a faintly greenish syrup. At no time during the course of any of the above reactions was sublimination of any kind noted.

Fifty parts of the above unsaturated polyester were blended with 50 parts of styrene. To 10 grams of this blend were added 15 drops of 6 percent cobalt naphthenate and 30 drops of 60 percent methyl ethyl ketone peroxide. When allowed to stand at room temperature for ten hours a clear tough plastic material resulted.

EXAMPLE II

Using the same procedure as in Example 1, a blend containing 50 parts of the unsaturated polyester prepared in Example I and 50 parts of diallyl phthalate was prepared. Catalysis with cobalt naphthenate and methyl ethyl ketone peroxide as in Example I produced a clear hard solid.

EXAMPLE III

In a similar manner blends of the unsaturated polyester of Example 1 and methyl methacrylate, methyl acrylate and vinyl acetate were prepared and cured. These cured products were all tough and hard.

It is to be understood that the foregoing detailed description is given merely by way of illustration and that many variations may be made therein without departing from the spirit of the invention.

The embodiments of this invention in which an exclusive property or privilege is claimed are defined as follows:

1. An unsaturated polyester having the formula:

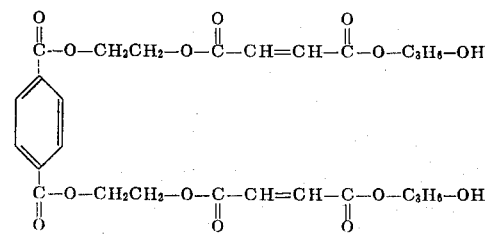

wherein the —C₃H₆— groups have the structure

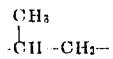

* * * * *